Feb. 21, 1928.  1,660,034
R. O. DUNLAP
DOG RACING TRACK
Filed June 8, 1927
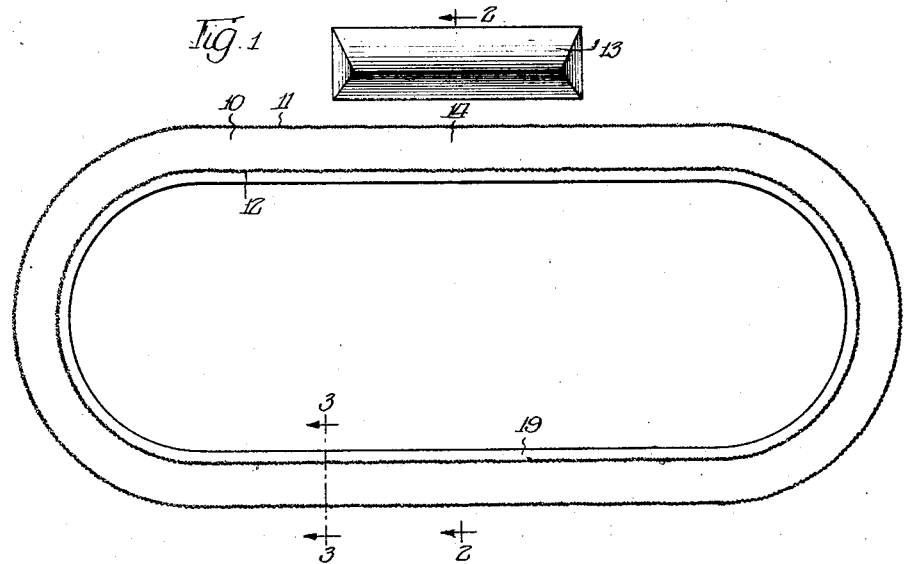
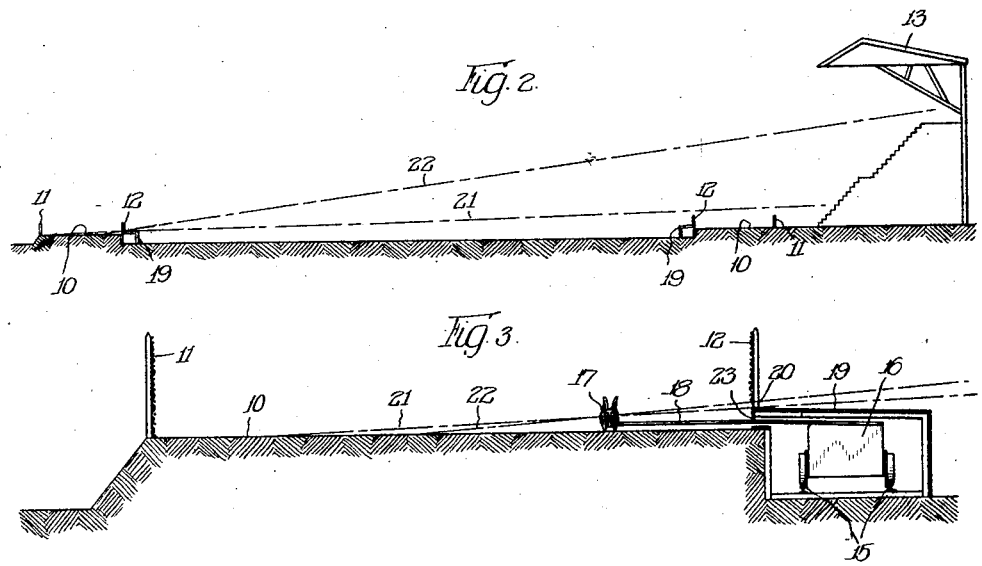
Inventor:
Roy O. Dunlap,
Witness:
P. Burkhardt Patented Feb. 21, 1928.

1,660,034

UNITED STATES PATENT OFFICE.

ROY O. DUNLAP, OF OAK PARK, ILLINOIS, ASSIGNOR TO ELECTRIC HOLDING CORPORATION, OF CHICAGO, ILLINOIS, A CORPORATION OF DELAWARE.

DOG-RACING TRACK.

Application filed June 8, 1927. Serial No. 197,269.

My invention has to do with dog racing, and is concerned particularly with the arrangement of the lure-conveyor housing relative to the course.

Prior to my invention dog racing courses had been constructed as shown in Smith Patent No. 1,379,224, with the lure-conveyor housing along the outside of the oval course, and with the slotted side wall of the housing at such a height as to form a barrier for the dogs along that side of the course.

The object of my invention is to provide an improved arrangement in which the housing is positioned about the inside as distinguished from the outside of the course and is surmounted by an open-work fence which forms the necessary barrier for the dogs. My improved arrangement renders the dogs and the lure easily visible at all times from the spectators' stand located at one side of the course, cuts down the length of the housing, and materially reduces the cost of constructing the dog racing track.

While the foregoing statements are indicative in a general way of the nature of my invention, other objects and advantages will be apparent upon a full understanding of the improved arrangement.

One form of my invention is presented herein for the purpose of exemplification, but it will of course be appreciated that various modifications may be made in such form without departing from the spirit of the invention.

In the accompanying drawing:

Fig. 1 is a plan view of a dog racing track constructed in accordance with the invention;

Fig. 2 is a section taken on the line 2—2 of Fig. 1; and

Fig. 3 is a detailed section taken on the line 3—3 of Fig. 1.

The dog racing track shown in the drawing includes an oval-shaped course 10 which is about fifteen feet wide and about one quarter of a mile long. An open-work fence 11 extends along the outer edge of the course, while another open-work fence 12 extends along the inner edge of the same. A stand 13 for the spectators is positioned opposite the stretch 14 of the course and from the stand the spectators may watch the dogs as they encircle the entire course during a race. The course is preferably elevated a little above the level of the surrounding ground, and the stand is preferably elevated a little above the level of the course.

A rail track 15 extends along the inner edge of the course, at a lower level than the same, and a lure-conveying car 16 is mounted on the rail track and supports a lure 17 on an arm 18 which projects laterally from the car over the course. The rail track is covered by an L-shaped housing 19 which is but slightly higher than the level of the course, and the free edge 20 of the housing forms the support for the previously mentioned fence 12 along the inner edge of the course. The roof portion of the housing is substantially horizontal, although it may slope slightly toward the infield in order to prevent water from draining on to the course in rains, and is preferably devoid of all truss work above the same which might tend to obstruct to a certain extent the vision of the spectators in watching the dogs from the stand, the free edge 20 of the roof portion being preferably supported in any suitable manner from within or rearwardly of the housing.

In the dog racing track above described, the housing as viewed from the stand gives the appearance of being substantially flush with the course, and does not obstruct the vision of the spectators in watching the dogs from the stand, since the housing is not anywhere near high enough to fence in the dogs along the inner edge of the course, and the fence which is provided on the housing for that purpose is of open-work construction, through which the dogs may be easily seen. Even on the portions of the course most removed from the stand, as for instance on the portion shown in section in Fig. 3, the dogs are not obscured from the spectators, as even those spectators low down in the stand can see everything on the course above the dot-dash line 21, while those spectators high up in the stand can see everything on the course above the dot-dash line 22, and the bodies of the dogs, usually large greyhounds, are well above such lines.

Although the tops of the open-work fences at the edges of the course are about three feet high to prevent the dogs from leaving the course, the top of the housing need only be about ten inches high, as the housing can be made as nearly flush with the course as conditions will permit without making the opening 23 between the course and the free edge 20 of the housing too small for sufficient clearance of the arm 18 which extends through such opening.

I claim:

1. A dog racing track, including a course, a fence along one edge of the course, a conveyer track along the other edge of the course at an elevation lower than the course, a conveyor on the conveyer track, means extending laterally from the conveyor for supporting a lure over the course, a housing over the conveyer track at an elevation but slightly higher than the course, and a transparent fence extending from the housing, and bounding said course.

2. A dog racing track, including a substantially oval-shaped course, a rail track along the inner side of the course at an elevation lower than the course, a conveyor on the rail track, a lure supporting arm projecting from the conveyor over the course, a housing over the rail track at an elevation but slightly higher than the course, and an open-work fence extending along the housing on the edge thereof nearest the inner side of the course.

3. A dog racing track, including a substantially oval-shaped course, a fence along the outer side of the course, a rail track along the inner side of the course at an elevation lower than the course, a conveyor on the rail track, a lure-supporting arm projecting from the conveyor over the course, an L-shaped housing having a substantially flat and unobstructed roof portion over the rail track at an elevation but slightly higher than the course, and a substantially transparent fence along the housing, said housing being arranged with the free edge of the roof portion thereof over the inner side of the course, and said fence being located on the housing adjacent the free edge of the roof portion.

In testimony whereof I have hereunto subscribed my name.

ROY O. DUNLAP.